United States Patent [19]
Poirier D'Ange d'Orsay

[11] 3,840,405
[45] Oct. 8, 1974

[54] CIRCULATING FUEL CELL WITH CRENELLATED ELECTRODE

[75] Inventor: Emmanuel J. Poirier D'Ange d'Orsay, Chemin de Pechbusque, France

[73] Assignee: Societe Anonyme pour l'Equipment Electrique de Vehicles S.E.V. Marshall, Issy Les Moulineaux, France

[22] Filed: June 5, 1972

[21] Appl. No.: 259,697

Related U.S. Application Data

[63] Continuation-in-part of Ser. No. 26,655, April 8, 1970, abandoned.

[52] U.S. Cl. ............................. 136/86 D, 136/86 R
[51] Int. Cl. ................... H01m 27/04, H01m 27/14
[58] Field of Search ...................... 26/655; 136/86

[56] References Cited
UNITED STATES PATENTS

| 3,160,528 | 12/1964 | Dengler et al. | 136/86 R |
| 3,257,239 | 6/1966 | Shultz, Jr. et al. | 136/86 D |
| 3,284,240 | 11/1966 | Kring | 136/86 R |
| 3,375,139 | 3/1968 | Tschenkel et al. | 136/86 R |
| 3,432,357 | 3/1969 | Dankese | 136/86 R |

Primary Examiner—A. B. Curtis
Attorney, Agent, or Firm—Plumley & Tyner

[57] ABSTRACT

A circulating fuel cell or fuel reactor containing an anodic and a cathodic compartment separated by an ionically conducting membrane, each compartment containing an electrode for collecting electrical current, generated by reaction of a chemical body contained in an electrically conductive, circulating liquid within one compartment with another chemical body in the other compartment of the reactor.

4 Claims, 2 Drawing Figures

PATENTED OCT 8 1974 3,840,405

INVENTOR:
Emmanuel J. Poirier D'Ange d'Orsay

By:
Plumley & Tyner

CIRCULATING FUEL CELL WITH CRENELLATED ELECTRODE

This is a continuation-in-part of Ser. No. 26,655, filed Apr. 8, 1970 in the U.S. Patent Office, now abandoned.

It is known that one can generate electric current if one arranges, on either side of an ionically conducting membrane, media which enclose chemical compounds capable of reacting with each other, by setting up electrodes in each of the media, to either side of the membrane. When apparatuses of this type involve the progressive introduction — on either side of the membrane — of compounds capable of reacting with each other, one generally refers to them with the term "fuel reactor" or "fuel cell".

In conventional-type fuel reactors, the reacting products can either be progressively moved into each of the media situated on either side of the membrance from the electrode itself — and in this case we are dealing with an apparatus of the porous electrode-type — or they can be progressively introduced on either side of the membrance due to a circulation of each of the media and we refer to this type of apparatus as "circulating-fuel reactor".

To improve the performances of fuel reactors, it has been proposed to circulate — in each of the anodic and cathodic compartments — carrier media which have absorbed reacting gases, said circulation taking place in a closed circuit by means of injection, upstream from the fuel reactor, of reacting gases and extraction, downstream, of reaction products formed. In this version, one encounters a difficulty coming from the nature of the circulating medium which is destined to absorb the reacting gases. In effect, it has been proposed to use, as a circulating medium, a slurry of active carbon possibly treated with catalysts; it is rather awkward to manipulate such a slurry of active carbon and this considerably limits the industrial application of this type of reactor.

Furthermore, in the case of electro-chemical generators not using any circulation and involving fixed electrodes, it has been found that the most convincing results were obtained by using, as reacting compounds, gases having a great affinity for each other. When one uses nongaseous reacting compounds, the yields are generally unsatisfactory and do not enable utilization on an industrial scale.

This invention is intended to provide a new type of circulating fuel reactor permitting one to accomplish the oxidation, on the one hand, and the reduction, on the other hand, of liquid or solid chemical products with electrical yields facilitating exploitation on an industrial scale.

The object of this invention is the new industrial product represented by a circulating-fuel reactor involving an anodic compartment and a cathodic compartment, separated by an ionically conducting membrane, each of the two compartments enclosing, on the one hand, an electrode enabling one to collect the currents corresponding to the reactions of the chemical bodies contained in one and the other of the two compartments, and, on the other hand, an electrically conducting liquid, essentially characterized by the fact that — at least in one of the compartments of the reactor — one causes the circulation of a liquid which is sensibly inert with regard to the elements of the compartment and of the electrode, said compartment filled with circulating liquid furthermore containing at least one chemical body in the form of a pulverulent solid, a liquid, or a gas, said chemical body having a great affinity for reacting with another chemical body in the solid or liquid state, placed in the second compartment of the reactor.

In one preferred mode of execution, the two compartments of the reactor are each supplied with a circulating liquid; the circulating liquid, placed in each of the two compartments, may advantageously be the same on both sides of the membrane.

In a first variant, the reacting chemical body, contained in the second compartment, consists of the solid electrode of this compartment.

In a second variant, the reacting chemical body contained in the second compartment is injected upstream from the reactor, in the form of a liquid or pulverulent solid, into the interior of the circulation current of the circulating liquid destined for this second compartment.

It should be noted that the fact that one causes the reacting chemical bodies to circulate in at least one of the reactor compartments enables one to use relatively unstable or corrodable compounds in the liquid medium into which they are introduced. In effect, if the injection of the product takes place in proximity of the entrance into the compartment of the fuel reactor, the product will be liable to change from the electronic state on contact with the electrodes before having been transformed due to instability or corrosion.

In the fuel reactors according to the invention, it is preferred to establish circulation currents in a closed circuit, the injection of active compounds taking place upstream from the fuel reactor compartments and the extraction of the reaction products taking place downstream, by any appropriate means; in the case where the reaction products formed are solids, one can use one filtration or one decantation; in the case where the reaction products formed are liquids, evacuation may be accomplished by overflow, a complementary continuous injection of circulating liquid being accomplished to retain a constant composition in the mixture.

One of the essential features of the invention is to make possible the use — in the fuel reactors — of liquid or solid chemical compounds which, when they are brought together in reactors whose compartments do not involve any fluid circulation, absolutely do not make it possible to attain satisfactory results.

It has been found furthermore that the construction of anodic and cathodic electrodes, placed in the reactor compartment, can, in the reactors according to the invention, be considerably modified with respect to the electrodes habitually used in presently known circulating-type reactors. I have found that — in the case of fuel reactors where the fluid carrying the reacting compounds is a slurry of active carbon — the electrodes can advantageously be used in the form of castellated or staggered grids, the elements of the crenels or indentations and of the baffles being arranged perpendicularly to the circulation current. This arrangement is necessary to assure in a suitable fashion the electron-collecting function of the anodic and cathodic grids, but it causes a considerable charge loss and a clogging in the circulation of the products. In the course of the practical implementation of the invention, it was found that one could obtain excellent results by setting up — inside the compartments of the reactor according to the invention — electrodes consisting of castellated or staggered grids whose elements are arranged parallel to the circulation current, primarily when the reacting compounds introduced into the compartment come in the form of pulverulent solids.

This invention therefore also relates to the new industrial product constituted by a circulating-fuel reactor in which at least one of its compartments contains an electrode formed by a plate or a grid in the form of crenels or parallel channels, the walls of the crenels or channels being arranged parallel to the direction of flow of the circulation current which moves through the compartment.

Although not bound by the explanation I believe that the good results, which can be obtained with electrodes constituted as just indicated, are due to the fact that, according to the invention, the circulating medium is a liquid and consequently presents a relatively low viscosity, which permits the establishment of a turbulence while the circulating medium traverses the compartment, a turbulence which causes impacts of the particles of reacting compounds upon the electrodes. It is clear that the crenellated or parallel-channel conformation or configuration may be obtained either with a single plate or grid or with an assembly of several plates or grids, the feature of the invention here being represented by the fact that one arranges the electrode parallel to the circulation current. One can also use a flat grid as electrode, said flat grid being placed in the immediate proximity of the membrane which separates the two compartments of the reactor. In the case where the electrode consists of a grid, one can use an expanded metal, it being understood here that the only characteristic necessary for the electrode is that it be composed of a good-conducting metal which must be stable in the circulating liquid used.

It is important to point out specifically that the fuel reactor according to the invention avoids the usual difficulty relative to the aging and contamination of the electrodes; moreover, the liquid circulation system adopted here enables us, in most cases, to avoid the use of catalysts since the reactions take place by themselves in a very rapid manner. Finally, the operation of the reactor and its generation of electric current is essentially a function of the injection of the reacting products, something which is accomplished upstream from the reactor; this constitutes one solution to the problem of storing or stock-piling the active substances necessary for the operation of the reactor. In effect, the injection of said products can take place only at the moment one desires this to happen, that is to say, at the moment when one wants the reactor to produce an electric current.

Among the circulation liquids one can use according to this invention are acid, basic, or neutral aqueous media and, in particular, aqueous solutions of electrolyte salt, the organic solvents, and, preferably, the polar solvents, fused solvents containing dissolved salts, such as fused [melted] acetamide. Generally speaking one can use any liquid having good electric conductivity and having suitable compatibility with regard to the anodic and cathodic compounds which are introduced into the reactor.

The determination of the reacting chemical bodies, which are introduced into the circulation of the reactor compartments, is performed with a view to the equivalent weight relative to the reaction between the anodic and cathodic compounds. One tries to obtain a large number of electrons during the reaction for as small a weight of the reacting products as possible; the equivalent weight relative to the reaction involved must therefore be as small as possible so that one will obtain a large current output for a small reactor weight. One also takes into consideration the variation in free energy corresponding to the reaction involved here, which corresponds to the potential which one can obtain without load between the reactor electrodes. These two criteria enable one to determine the pairs of reacting chemical compounds which one can use most advantageously in the reactor according to the invention.

Among the anodic chemical products which are particularly useful here are metals and, particularly, lithium, calcium, magnesium, aluminum, zinc, indium, manganese, lead, and the alloys of these metals. One can also use alcohols, acids, aldehydes, ketones, hydrocarbons, hydrazine and its substituted derivatives, the di-hydrazides and, in particular, the di-hydrazide of oxalic acid or of adipic acid, thiourea and its derivative, such as methyl-thiourea and dithiobiurea.

Among the particularly useful cathodic chemical products, are the peroxygenated salts, and, in particular, the permanganates, persulfates, periodates, bichromates, bismuthates, bromates, iodates, halogens, halogenated salts and, in particular, the halogenated salts of metals such as silver, copper, nickel, cobalt, manganese, cadmium and lead, the oxides of metals such as those just listed, sulfur and sulfides of metals such as those listed above, the hypohalogenated compounds, manganic compounds, nitro compounds, nitroso compounds containing positively charged halogen atoms, addition compounds involving halogen atoms, peroxides, and quinones.

For the membrane separating the two compartments of the reactor according to the invention, one can advantageously use any membrane having good ionic conductivity and which is stable with respect to circulating liquids and reacting compounds; in particular one can use films of a product known under the commercial brand name of "cellophane" or ion-exchanging membranes.

To facilitate a better understanding of the object of the invention, there are now described by way of non-restrictive and purely illustrative example, several modes of execution shown on the attached drawing.

Figure 1:
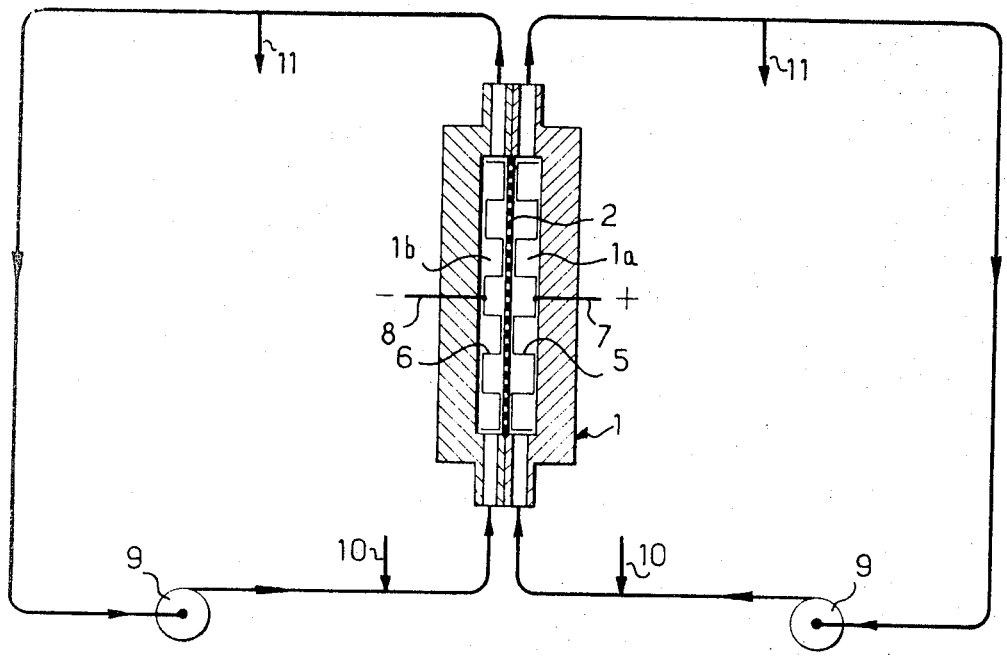
FIG. 1 is a schematic illustration of the circulation circuits pertaining to the two compartments of the reactor according to the invention.
Figure 2:
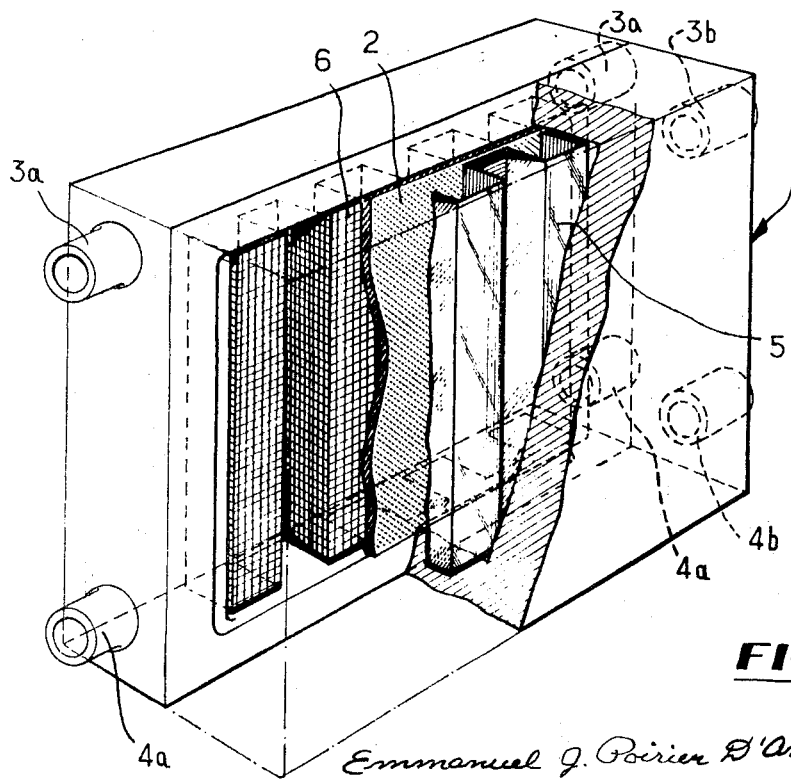
FIG. 2 is an exploded perspective view and shows an element of the fuel reactor according to the invention, involving two compartments whose electrodes are formed in the shape of crenels.

Referring now to the drawing, the number 1 designates the entire fuel reactor element according to the invention. The element 1 has an essentially parallelepipedic form; it is divided into two essentially equal compartments by a membrane 2 which is parallel to the major sides of the parallelepiped. The membrane 2 is a thin sheet of polypropylene having a porosity of about 40 percent. The element 1 is made of polypropylene and the weight of the two compartments together is about 200 g. The membrane 2 has a useful surface with a height of 10 cm and a width of 10 cm.

The number 1a designates the anodic compartment and the number 1b the cathodic compartment. Each compartment is equipped with its lower or upper portion having two entrance openings 3a, 3b arranged symmetrically with respect to the plane of symmetry of the compartment. This plane of symmetry is perpendicular to the plane of the membrane 2. The openings 3a, 3b communicate with a distribution groove arranged inside the compartment, a groove which is in the prolongation of the openings 3a, 3b, mentioned above. On the face of each compartment, which is opposite the face parallel to which and in the vicinity of which one finds openings 3a, 3b, there are arranged two similar outlet openings 4a, 4b, likewise connected through each other to the interior of the compartment by a groove. Inside of each compartment is an electrode, and designated by the number 5 the anodic electrode which is inside the compartment 1a and the number 6 designates the cathodic electrode which is inside the compartment 1b. The electrodes 5 and 6 communicate, respectively, with the exterior of the reactor element through conductors 7 and 8. The electrodes 5 and 6 are plates or grids folded in the form of crenels parallel to the axis which is perpendicular to the faces of the compartment parallel to which are arranged openings 3a, 3b, and openings 4a, 4b.

The circulation circuits assigned to each of the compartments 1a and 1b are identical. They each include one circulation pump 9, and injection device 10 which enables the introduction into the circulating current of the reacting chemical compounds, and an extraction device 11 which enables the evacuation from the circulating current, the reaction products which have formed inside each of the compartments 1a and 1b. The circulating liquid circuit assigned to each of the compartments 1a and 1b is a closed circuit. The following four examples for setting up the reactor elements illustrate the present invention.

EXAMPLE 1

For the two compartments 1a and 1b, is used a circulating liquid flow rate of 115 liters/hr. The electrode 5 is a sheet of aluminum with a purity of 99.5 percent and a thickness of 0.5 mm; this anode is so folded as to form 12 folds with a width of 8 mm and a depth of 10 mm; one can thus put 11 parallel circulation channel in the compartment. The cathodic electrode 6 is a nickel grid made of expanded metal, an expanded metal whose links [mesh] have the form of a lozenge with a small diagonal of 1.5 mm and a large diagonal of 2.2 mm. The cathodic electrode is likewise made up of twelve folds having the same dimensions as the anodic electrode. The membrane is a sheet of polypropylene with a thickness of 140 microns and a porosity of 40 percent. The circulating liquid is the same in the anodic and cathodic circulation circuits; it is so selected as to prevent any difficulty with respect to the aluminum electrode 5, it consists of a watery solution containing 27 percent ammonium chloride and 17 percent zinc chloride. The reacting chemical product in the anodic compartment is the aluminum electrode 5. The reacting chemical product of the cathodic compartment is introduced into the cathodic circulation circuit upstream from the reactor; it consists of finely powdered persulfate of potassium. Circulation takes place from bottom to top.

It has been found that the no-load potential between the conductors 7 and 8 is 0.75 v, when one introduces 2 g/min of powdered potassium persulfate; one can obtain 3.2 A with 0.37 v.

EXAMPLE 2

Exactly the same reactor element as the one described in Example 1 is employed and the solution circulating in the anodic and cathodic circuits is the same as in Example 1. The reacting chemical product of the anodic circuit is electrode 5. The reacting chemical product of the cathodic circuit is introduced into the cathodic circulation in the form of a powder, upstream from the reactor; it consists of finely-powdered cupric chloride; and there is obtained 6.08 A with 0.68 v.

EXAMPLE 3

The anodic compartment 1a contains an electrode 5 consisting of an aluminum sheet with a purity of 99.5 percent and a thickness of 0.5 mm; electrode 5 is made in six folds with a width of 15 mm and a depth of 10 mm; these folds give five parallel circulation channels. The cathodic compartment 1b contains an electrode consisting of a nickel grid made of expanded metal whose loops or mesh have the form of a lozenge with a small diagonal of 1.5 mm and a large diagonal of 2.2 mm; this electrode 6 consists of six folds identical to those in electrode 5. The membrane 2, which separates the compartments 1a and 1b, is a sheet of polypropylene with a thickness of 67 microns, having a porosity of about 40 percent.

The liquid circulating through the anodic and cathodic circuit is an aqueous solution of ammonium chloride, 300 g/l and of zinc chloride, 150 g/l; this solution is so chosen as to avoid any difficulty in the presence of the aluminum electrode 5. The reacting chemical product of the cathodic compartment is introduced into the cathodic circulation in the form of a fine powder upstream from the reactor; it consists of powdered cupric chloride. Circulation takes place from bottom to top.

Between conductors 7 and 8 there is a no-load potential of 0.85 v when there is introduced 2 g/min of cupric chloride in a cathodic circulation circuit. There are obtained 4.8 A with 0.6 v.

EXAMPLE 4

The reactor element, which was used, involves two identical electrodes 5 and 6 made up of a grid of nickel consisting of expanded metal whose loops have the form of a lozenge with a small diagonal of 1.5 mm and a large diagonal of 2.2 mm; these electrodes form 12 folds with a width of 8 mm and a depth of 10 mm; these folds constitute 11 parallel circulation channels. The membrane is a sheet of polypropylene with a thickness of 140 microns and a porosity of 40 percent.

The liquid circulating in the anodic and cathodic compartments is an aqueous solution with 27 percent ammonium chloride and 17 percent zinc chloride. The reacting chemical product of the anodic compartment is a powder of magnesium and aluminium introduced into the anodic circulation current upstream from the reactor. The reacting product of the cathodic compartment is a powder of cupric chloride introduced into the cathodic circulation current upstream from the reactor. Circulation takes place from the bottom to the top.

Between the conductors 7 and 8 there is a no-load potential of 1.2 v when one introduces, into the cathodic circulation current, 2 g/min of cupric chloride and, into the anodic circulation current, 1.6 g/min of powder of aluminium and magnesium in equal parts; there is obtained 7.2 A with 0.83 v.

It is to be understood that the above described modes of execution are by no means restrictive and could give rise to all kinds of desirable modifications without going beyond the framework of the invention.

What is claimed is:

1. A circulating-fuel reactor comprising an anodic compartment and a cathodic compartment separated by an ionically conductive membrane, each of the two compartments enclosing, on one hand, an electrode enabling the collection of the currents corresponding to the reactions of the chemical bodies contained in one and the other of the two compartments and, on the other hand, an electrically conducting liquid and, in at least one of the compartments of the reactor, there is a circulating liquid free from catalyst that is sensibly inert with respect to the elements of the compartment and of the electrode, said compartment filled with circulating liquid furthermore containing at least one chemical body in the form of a pulverulent solid, a liquid or a gas, said chemical body being capable of reacting with another chemical body in the solid state of the liquid state placed in the second compartment of the reactor and means in the second compartment, upstream from the reactor, for injecting the reacting chemical body in the form of a liquid or a pulverulent solid in the current of liquid destined for said second compartment, at least one of said compartments containing an electrode formed by a crenellated or parallel-channel plate or grid, the walls of the crenels or channels being arranged parallel to the direction of flow of the circulation current which traverses the compartment.

2. A fuel reactor according to claim 1, in which the reacting chemical bodies, introduced into the circulating current of one of the two compartments of the reactor, are relatively unstable or corrodable bodies in the circulating medium to which they are introduced.

3. A circulating-fuel reactor according to claim 2, in which at least one of the compartments of the reactor contains an electrode consisting of an expanded metal grid.

4. A circulating-fuel reactor according to claim 1, in which at least one of the compartments of the reactor contains an electrode consisting of an expanded-metal grid.

* * * * *